United States Patent
Precoda et al.

(10) Patent No.: US 7,716,037 B2
(45) Date of Patent: May 11, 2010

(54) METHOD AND APPARATUS FOR NATURAL LANGUAGE TRANSLATION IN A FINITE DOMAIN

(75) Inventors: Kristin Precoda, Mountain View, CA (US); John Brecht, San Francisco, CA (US)

(73) Assignee: SRI International, Menlo Park, CA (US)

( * ) Notice: Subject to any disclaimer, the term of this patent is extended or adjusted under 35 U.S.C. 154(b) by 547 days.

(21) Appl. No.: 11/135,765

(22) Filed: May 24, 2005

(65) Prior Publication Data

US 2005/0261910 A1    Nov. 24, 2005

Related U.S. Application Data

(60) Provisional application No. 60/574,063, filed on May 24, 2004.

(51) Int. Cl.
*G06F 17/28* (2006.01)

(52) U.S. Cl. .............................. 704/2; 704/5; 704/277
(58) Field of Classification Search ............... 704/1–10, 704/277, 258, 260, 270
See application file for complete search history.

(56) References Cited

U.S. PATENT DOCUMENTS

| | | | | |
|---|---|---|---|---|
| 5,535,120 A * | 7/1996 | Chong et al. | .................... | 704/3 |
| 6,278,968 B1 * | 8/2001 | Franz et al. | .................... | 704/3 |
| 6,285,978 B1 * | 9/2001 | Bernth et al. | .................. | 704/7 |
| 6,760,695 B1 * | 7/2004 | Kuno et al. | .................... | 704/9 |
| 6,996,520 B2 * | 2/2006 | Levin | .......................... | 704/10 |

* cited by examiner

*Primary Examiner*—Huyen X. Vo

(57) ABSTRACT

A method and apparatus are provided for performing natural language translation in a finite domain, e.g., where the finite domain describes a specific subject area or field of use. In one embodiment, a method for translating user input relating to a finite domain includes receiving user input in a source language and translating the user input into a target language in accordance with the finite domain. In some embodiments, the resultant output is substantially grammatically correct and/or sociolinguistically appropriate.

28 Claims, 3 Drawing Sheets

METHOD AND APPARATUS FOR NATURAL LANGUAGE TRANSLATION IN A FINITE DOMAIN

CROSS REFERENCE TO RELATED APPLICATIONS

This application claims the benefit of U.S. Provisional Patent Application Ser. No. 60/574,063, filed May 24, 2004 (titled "System And Method For Translation Of Limited Natural Language Phrases"), which is herein incorporated by reference in its entirety.

FIELD OF THE INVENTION

The present invention relates generally to natural language translation and relates more specifically to the translation of natural language phrases in finite domains.

BACKGROUND OF THE DISCLOSURE

Many situations exist in which the inability to bridge a language barrier can have drastic consequences. For example, medical professionals may need to communicate information regarding health or treatment to patients who speak different languages. If a patient cannot understand the information being communicated, he or she may miss or misunderstand critical information regarding, for example, a regimen for taking prescription drugs. Failure to adhere to the proper regimen can result in further health problems, contagion or even death in some cases.

Because trained human interpreters are not always available to assist in such communications, some such situations may rely on the assistance of an automatic language translation device. However, the capabilities of typical automatic language translation devices are still quite technologically limited and thus may still result in miscommunications. There is therefore still a danger in using such devices to assist in the communication of critical information.

Thus, there is a need in the art for a method and apparatus for semantically and grammatically correct natural language translation in a finite domain.

SUMMARY OF THE INVENTION

A method and apparatus are provided for performing natural language translation in a finite domain, e.g., where the finite domain describes a specific subject area or field of use. In one embodiment, a method for translating user input relating to a finite domain includes receiving user input in a source language and translating the user input into a target language in accordance with the finite domain. In some embodiments, the resultant output is substantially grammatically correct and/or sociolinguistically appropriate.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention relates to a method and apparatus for natural language translation in a finite domain, e.g., where the finite domain describes a specific subject area or field of use. In one embodiment, the invention facilitates the accurate translation of phrases occurring in a limited, well-defined domain, such as a medical domain. By focusing on this limited domain rather than on the full range of possible natural language expressions, most of which would never be uttered or useful in certain situations, more accurate translation of the relevant information can be achieved.

Figure 1:
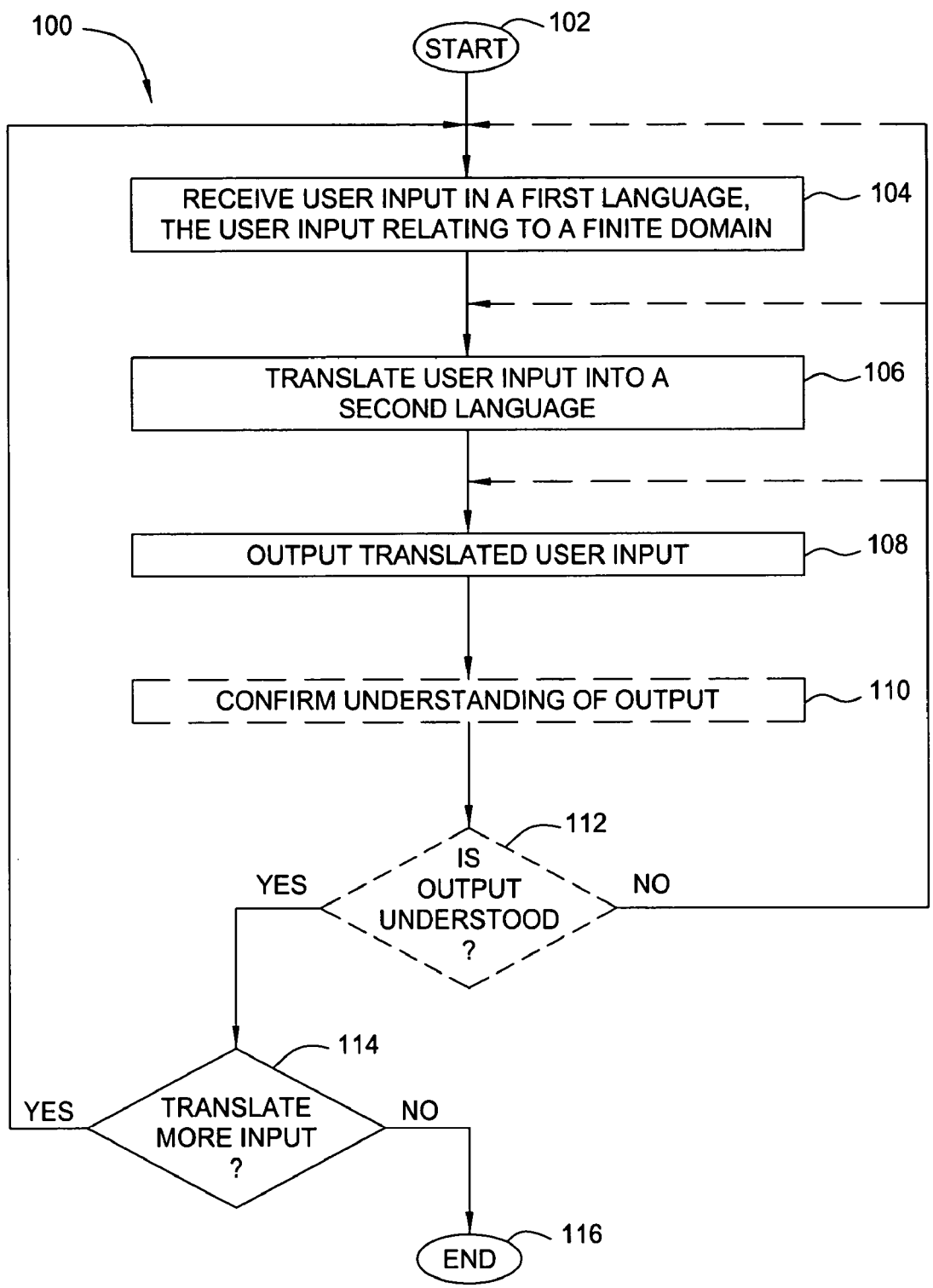
FIG. 1 is a flow diagram illustrating one embodiment of a method for natural language translation in a finite domain.

FIG. 1 is a flow diagram illustrating one embodiment of a method 100 for natural language translation in a finite domain. The method 100 may be implemented in, for example, an automatic language translation device that is tailored for use in a specific field.

The method 100 is initialized at step 102 and proceeds to step 104, where the method 100 receives user input in a first (i.e., source) language. In one embodiment, the received user input is a natural language input relating to a finite domain. For example, the user input may relate to a medical domain, where the user is an English-speaking pharmacist attempting to communicate instructions for taking a prescription drug to a Spanish-speaking patient. In further embodiments, the first language may not be a human language—for example, the user input may be received in an encoded form such as a barcode.

In one embodiment, the user input is at least one of a graphical user interface input (e.g., received via a keyboard, a stylus, a touch screen, a mouse, a pen or the like), a gesture, text or image input (e.g., received via a barcode scanner, a camera or the like), or a spoken input (e.g., received via a microphone or the like). In further embodiments, user input includes data received from remote sources (e.g., via a network), such as remote databases.

In one embodiment, at least some of the user input is entered (e.g., via a keyboard, a stylus or the like) into a template or form that is presented to the user. The template includes at least one of a free-form field and a plurality of predetermined potential entries comprising key terms or choices of terms for entry of specific parameters by a user. For example, one template for counseling a patient on the proper method of taking a medication may read, "Take X tablets Y times a day Z", where the user is prompted to either choose from a menu or insert a number in place of X, a number in place of Y and an optional method in place of Y (e.g., "with food", "with water" or "on an empty stomach"). In one embodiment, the template allows the entry of parameters using an encoding for rapid or convenient input (e.g., an entry of "q8h" may mean "every eight hours").

In another embodiment, the user input is received at least in part via a barcode scanner that scans a barcode printed on a relevant item for information. For instance, in the above example, the barcode could be printed on the packaging of a dispensed drug (or other clinical product) and contain information such as a unique identifier for the drug (which can be used to query a database to retrieve information for input), quantity instructions for the drug, side effects of the drug, safety information and precautions, information about the drug's interaction with other substances and the like. Alternatively, the barcode could contain free-form data that can be inserted into a template as described above. In further embodiments, the barcode also contains information specifying a language to translate counseling information into. In still further embodiments, the packaging contains a phone number and code to key in for remote access to pharmaceutical information (e.g., by illiterate patients).

In yet another embodiment, the user input is an image that is received and processed in accordance with known optical character recognition techniques. For instance, in the example above, the user input may be a captured image of a label on the packaging of the dispensed drug. The results of the optical character recognition processing may be implemented alone or in combination with other user input to construct a communication for translation.

In yet another embodiment, the user input may additionally include supplemental information about the user (e.g., the individual entering the information to be translated) or the individual with whom the user is communicating (e.g., as retrieved from a database). This supplemental information may be used to augment the ultimate communication (e.g., by entering the supplemental information into an additional template). For instance, in the example above, relevant supplemental information could include the patient's preferred language (e.g., including dialect) and output method (e.g., for patients who are illiterate or visually or hearing impaired), the patient's gender and/or age, other information that plays a role in generating grammatically correct and sociolinguistically appropriate translations, other drugs and/or medical devices the patient is using and/or the patient's medical history. Thus, for example, communication to the patient could be augmented with advice regarding any potential interactions between previously dispensed drugs and the currently dispensed drug.

In yet another embodiment, the user input is received via a single entry identifying a specific item (e.g., a button on a user device that indicates a specific medication) or via entry of a portion of an identifier for a specific item (e.g., the first three letters of a medication's name). This entry may be associated with locally or remotely stored data that can be retrieved to aid in completing the full user input for translation.

In yet another embodiment, the user input may include the selection of one or more pre-programmed phrases, such as "Do you speak this language?", "I am going to tell you my name" or "I am going to use this device to tell you how to take your prescription". In addition to ensuring that the ensuing communication will be understood, such phrases may also help to establish a rapport between the communicating parties.

In yet another embodiment, the user input may also include one or more attributes that are needed in order to produce sociolinguistically appropriate translations. For example, in some languages, conjugation of verbs and selection of appropriate pronouns and adjectives is dependent upon the gender of the speaker and/or listener, the age of the listener relative to the speaker, or the relative social status of the speaker and listener. Thus, the method 100 may present the user with the option of selecting or specifying attributes that may influence the construction of a sociolinguistically appropriate translation.

In step 106, the method 100 translates the user input into a second (i.e., target) language, in accordance with the finite domain. That is, the translation capabilities of the method 100 are substantially limited to the particular domain at issue and may not extend substantially to unrelated domains or subject areas. In one embodiment, step 106 includes both receiving (e.g., from the user) a selection of a target language and the subsequent translation of the user input into the selected target language. The actual translation of the user input into the selected target language is performed in accordance with knowledge of the target language's structure (e.g., to produce a grammatically correct and sociolinguistically appropriate translation), as discussed in greater detail with respect to FIG. 2.

Once the user input has been translated into the target language, the method 100 proceeds to step 108 and outputs the translated user input. In one embodiment, the output is at least one of a text, audio, video, graphical or haptic output. In one embodiment, audio (e.g., spoken natural language) output is produced by concatenating pre-recorded fragments of speech together. In another embodiment, audio output is produced in accordance with one or more known speech generation techniques.

In an alternative embodiment, at least part of the text output is visually displayed by an automatic language translation device on which the method 100 is executing (e.g., on a screen or other display). In another embodiment, at least part of the text output may be printed to a hard (e.g., paper) copy, which may be taken by the person for whose benefit the translation was generated. For instance, in the example above, the text output may be a printout of instructions for taking a prescription medication, and may additionally include labels or other packaging. In yet another embodiment, at least part of the text output may be presented in Braille or other haptic form. In further embodiments, at least a part of the text output is presented as a series of figures and/or icons, e.g., for viewing by illiterate patients.

Step 108 may be repeated as necessary (e.g., the output may be replayed or redisplayed), for example if a distraction or other factor prevented the output from being fully apprehended or understood the first time.

In optional step 110 (illustrated in phantom), the method 100 confirms the user's understanding and/or retention of the translated output. For example, the method 100 may present the user with one or more questions that are characterized by having limited domains of possible responses, such as "How many tablets should you take each day?", where the expected answer is a certain number within a limited domain of positive numbers. Possible responses may be input in any of the same methods in which original user input for translation is received, including gesture responses. In one embodiment, such confirmatory questions are generated automatically (e.g., using the user input received in step 104 as input for a translation graph as described in further detail with respect to FIG. 2). In another embodiment, such confirmatory questions are "canned" or stored questions that are generally applicable. In yet another embodiment, confirmatory questions are a combination of automatically generated and canned questions.

In further embodiments still, these confirmatory questions may comprise the original input to be translated (e.g., the confirmatory questions may not be preceded by additional translation in the same execution of the method 100). For example, in the case where the translated input is prescription information, such information may be initially provided at a remote location (e.g., by a doctor or nurse rather than the pharmacist or individual filling or explaining the prescription). Thus, such confirmatory questions could be implemented as the original input (e.g., as received in step 104), and subsequent execution of the method 100 may serve to fill "gaps" in an individual's understanding of the previously provided information.

In optional step 112 (illustrated in phantom), the method 100 determines whether the translated output has been understood and/or retained (e.g., based on the response(s) to the confirmatory question(s)). If the method 100 determines that the response(s) indicate a lack of understanding and/or retention, the method 100 returns to step 104 (or alternatively to step 106 or step 108) and proceeds as described above, e.g., in a second attempt to communicate. In one embodiment, rather than simply re-stating the original translated output, the new translation step 106 includes translating the input in a new way. For example, the new translation step may include using at least one of synonyms for terms in the original translated output, different grammatical structures, and different prosody to emphasize the portions of the original translated output that were not understood and/or retained.

Alternatively, if the method 100 determines that the translated output has been understood and/or retained, the method 100 proceeds to step 114 and determines whether there is more input to be translated (e.g., as indicated by a user prompt). For example, in the case where prescription information is being translated, information for multiple prescriptions may need to be communicated. If the method 100 determines in step 114 that additional translation is required or requested, the method 100 returns to step 104 and proceeds as described above in order to translate the additional input. Alternatively, if the method 100 determines in step 114 that additional translation is not required, the method 100 terminates in step 116.

In further embodiments, the translation step 108 may be interrupted for correction of user errors (e.g., where the user input is incorrect). For example, output in progress can be interrupted, e.g., by stopping the playback of audio or text. In further embodiments, the method 100 may output a translated error message to alert a listener to the error condition (e.g., "Sorry, that was a mistake. I'm going to correct it and play it for you again."). This error message may be repeated as necessary, and corrected user input can be entered for translation.

The method 100 thus enables accurate (e.g., reflective of the intended meaning) and versatile language translation by focusing on finite domains of use. By focusing on a finite domain rather than on the full range of expressions and vocabulary for given languages, the method 100 can devote more resources to providing translations that are grammatically correct and sociolinguistically appropriate, and therefore more likely to be understood by an individual with whom a user is communicating. In addition, the optional confirmatory questions included in the method 100 may further enhance understanding. This greater level of accuracy is especially helpful in fields like health care, where communication and understanding between two or more parties is critical.

For instance, in the example above, it is important that individuals who require medication or other clinical items understand how to use those items in order to be effectively treated. The present invention substantially ensures that, regardless of language barriers, this critical information will be communicated in an understandable way and will be known to have been communicated (e.g., via the use of confirmatory questions). Moreover, the present invention may be implemented to help ensure a patient's compliance with a treatment regimen. For example, the present invention may help a pharmacist or a doctor to confirm that the patient is adhering to the proper regimen (e.g., by entering user input such as, "Tell me how your doctor told you to take this medication.").

Figure 2:
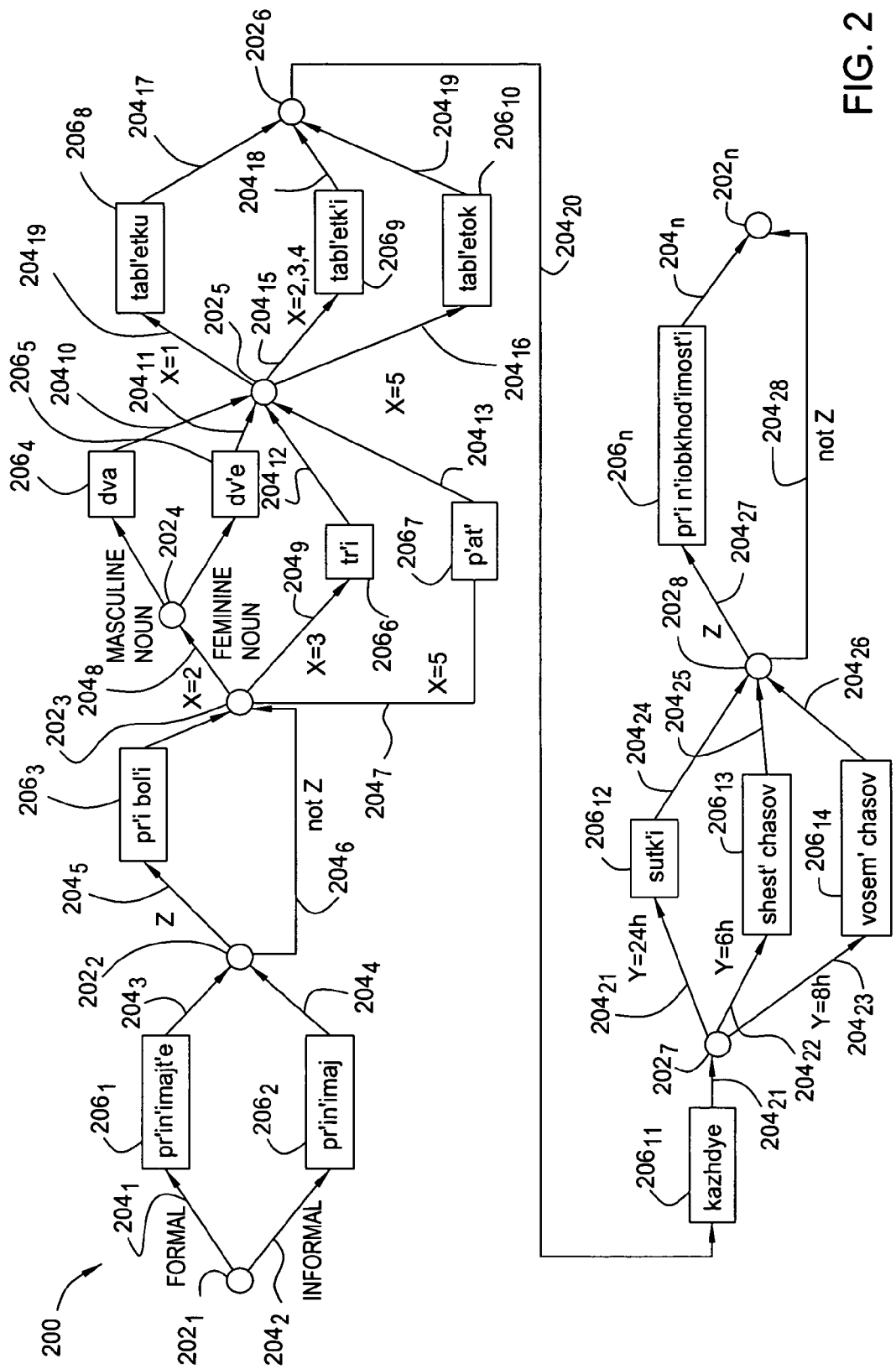
FIG. 2 illustrates an exemplary graph for producing a grammatically correct and sociolinguistically appropriate translation in accordance with the method of FIG. 1.

FIG. 2 illustrates an exemplary graph 200 for producing a grammatically correct and sociolinguistically appropriate translation in accordance with the method 100. The method 200 is particularly useful for real-time construction of translations (e.g., as opposed to translation using exclusively pre-recorded complete phrases). Specifically, the graph 200 illustrates one embodiment of a method for translating a portion of the template "Take X tablets every Y [as needed for pain]" into Russian, where X indicates a number of tablets, Y indicates a frequency and [as needed for pain] is an optional element represented as "Z" on the graph 200.

The graph 200 comprises a plurality of nodes $202_1$-$202_n$ (hereinafter collectively referred to as "nodes 202") connected by a plurality of conditional transitions $204_1$-$204_n$ (hereinafter collectively referred to as "conditional transitions 204") and/or a plurality of output phrases $206_1$-$206_n$ (hereinafter collectively referred to as "output phrases 206"). Some nodes 202 represent choices that must be made in terms of selection of appropriate word forms (e.g., where the choice is determined by attributes of the individual for whose benefit the translation is being performed, such as gender, age and the like) or parameters. Other nodes 202 inquire about the content to be translated (e.g., in the case of node $202_2$ "for pain" or not). Other nodes 202 have no content at all and merely are present for drawing convenience (e.g., as in the case of nodes $202_3$, $202_6$ and $202_{20}$). Conditional transitions 204 represent transitions between nodes 202 where the transitions have triggering events and/or guarding conditions (including the output of information from a node 202), except for conditional transition $204_{20}$, which has no content and is present for drawing convenience. Output phrases 206 represent the translation that results from selection of a particular conditional transition 204.

For example, in one embodiment, translation of the template into Russian is initiated at node $202_1$, where the graph 200 examines the user input in order to determine whether to use a "formal" (as represented by conditional transition $204_1$) or "informal" (as represented by conditional transition $204_2$) form of language when addressing the individual to whom the user is communicating. If the formal form was selected, the graph 200 proceeds along conditional transition $204_1$ and selects the output $206_1$ for the formal form of the Russian verb for take, "pr'in'imajt'e"; alternatively, conditional transition $204_2$ leads to the informal output form $206_2$, "pr'in'imaj".

The translation then proceeds to node $202_2$, where the graph 200 determines whether the input selected for the parameter Z is "as needed for pain". If so, conditional transition $204_5$ is followed to output $206_3$ for the Russian translation, "pr'i bol'i", before proceeding to the next node $202_3$. In the alternative case, processing proceeds straight from node $202_2$ to node $202_3$.

Processing in accordance with the graph 200 proceeds in a similar manner, choosing the appropriate forms for necessary words at each node 202 that requires such a decision, until a final node $202_n$ is reached from which there are no further conditional transitions 204. At this point, all selected outputs 206 are combined to form the translated output. The combination of the outputs 206 is language-dependent: in some cases, simple concatenation of the outputs 206 will produce the correct translation, but in other cases, some re-ordering of the outputs 206 will be required. For example, the concatenated translation of the user input, "Take 3 tablets every 24 hours", with formal form selected, produces "Pr'in'imajt'e tr'i tabl'etk'i kazhdye sutk'i". As discussed above, this translation may be output in any form, including text, audio, video, graphical and haptic form.

Those skilled in the art will appreciate that the graph 200 shows only the transitions for X=2, 3 or 5 (from node $202_3$) and Y=6 h, 8 h or 24 h (from node $202_7$), for the sake of simplicity. One embodiment of a full version of the graph 200 would include output for other values of X and Y, as well as other possible phrases in the template (e.g., the verb "take" might apply only to oral medications, so other embodiments could include templates for instructions regarding injections, inhalers, topical applications and the like).

Figure 3:
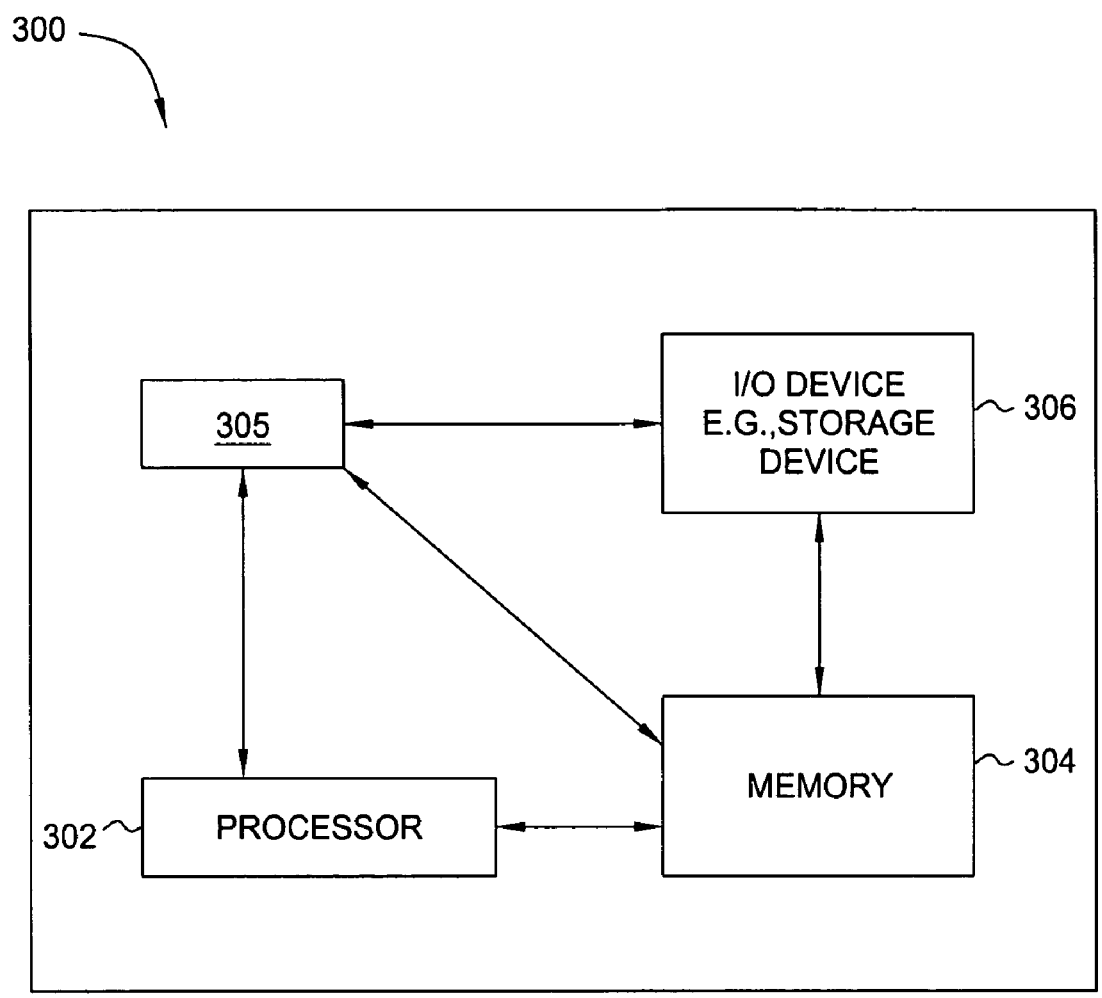
FIG. 3 is a high level block diagram of the present method for natural language translation in a finite domain that is implemented using a general purpose computing device.

FIG. 3 is a high level block diagram of the present method for natural language translation in a finite domain that is implemented using a general purpose computing device 300. In one embodiment, a general purpose computing device 300 comprises a processor 302, a memory 304, a data translation module 305 and various input/output (I/O) devices 306 such as a display, a keyboard, a mouse, a modem, and the like. In one embodiment, at least one I/O device is a storage device (e.g., a disk drive, an optical disk drive, a floppy disk drive). It should be understood that the translation module 305 can be implemented as a physical device or subsystem that is coupled to a processor through a communication channel.

Alternatively, the translation module 305 can be represented by one or more software applications (or even a combination of software and hardware, e.g., using Application Specific Integrated Circuits (ASIC)), where the software is loaded from a storage medium (e.g., I/O devices 506) and operated by the processor 302 in the memory 304 of the general purpose computing device 300. Thus, in one embodiment, the translation module 305 for translating natural language in a finite domain described herein with reference to the preceding Figures can be stored on a computer readable medium or carrier (e.g., RAM, magnetic or optical drive or diskette, and the like).

Those skilled in the art will appreciate that although the present invention has been described in the exemplary context of a medical domain (e.g., where the invention facilitates prescription counseling of patients), the present invention is applicable in a broad variety of alternative domains and situations where language translation in a finite domain is useful.

Moreover, in some embodiments, the present invention may be embodied in an automated system, e.g., where the only user is the individual for whom the input is being translated. For example, in the exemplary case of prescription counseling, a patient could provide a code or a number associated with the patient as the user input (which might implicitly identify a preferred language). The present invention would then provide, for example, instructions on how to use a recently dispensed item. Alternatively, the code or the number could be associated with a particular prescription item, where further specification of a preferred language triggers the provision of instructions in the preferred language.

Thus, the present invention represents a significant advancement in the field of automatic language translation. Embodiments of the invention facilitate the accurate translation of words and phrases occurring in a limited, well-defined domain (e.g., a medical domain). By focusing on this limited domain rather than on the full range of possible natural language expressions, most of which would never be uttered or useful in certain situations, grammatically correct and sociolinguistically appropriate translation of the relevant information can be achieved.

Although various embodiments which incorporate the teachings of the present invention have been shown and described in detail herein, those skilled in the art can readily devise many other varied embodiments that still incorporate these teachings.

What is claimed is:

1. A method for translating an input relating to a finite domain, the method comprising:

receiving from a first individual said input relating to said finite domain;

automatically translating said input into an output statement in a target language, where said translating comprises using a processor to select at least one appropriate word form for at least one word in said input based on at least one attribute of a second individual to whom said output statement is directed such that said output statement is substantially sociolinguistically appropriate;

outputting said output statement at least once;

confirming that said second individual understands said output statement; and re-attempting translation of said input if said second individual does not understand said output statement, wherein said re-attempting comprises modifying a prosody of said output statement, wherein said prosody is modified in a portion of said output statement that is not understood by said second individual.

2. The method of claim 1, further comprising:

interrupting said translating to correct at least one error in said input.

3. The method of claim 1, wherein said input is at least one of: a graphical user interface input, a gesture input, a text input in a source language, an image input, a spoken input in a source language, a pre-programmed phrase in a source language, or data retrieved from a database.

4. The method of claim 3, wherein said data retrieved from said database relates to said second individual.

5. The method of claim 4, wherein said data identifies at least one of: said target language, a preferred output method, a gender of said second individual, an age of said second individual, other information that plays a role in generating grammatically correct and sociolinguistically appropriate translations, a medical history of said second individual, or one or more drugs or devices used by said second individual.

6. The method of claim 1, wherein said input is received via at least one of: a keyboard, a stylus, a touch screen, a mouse, a pen, a barcode scanner, a camera, a microphone, or a network connected to a database.

7. The method of claim 1, wherein said input is received in a template form.

8. The method of claim 1, wherein said input comprises said at least one attribute that is needed in order to produce a sociolinguistically appropriate translation of said input into said target language.

9. The method of claim 1, wherein said translating is performed in accordance with knowledge of a structure of said target language.

10. The method of claim 1, wherein said output statement is output in at least one of: a text form, an audio form, a video form, a graphical form, a haptic form, or a Braille form.

11. The method of claim 1, wherein said output statement is output by concatenating pre-recorded fragments of speech.

12. The method of claim 1, wherein said output statement is output in accordance with a speech generation technique.

13. The method of claim 1, wherein understanding of said second individual is confirmed by presenting said second individual with one or more questions to test said understanding.

14. The method of claim 1, wherein the translating comprises determining whether to use a formal or informal form of the target language.

15. A computer readable storage medium containing an executable program of a method for translating an input relating to a finite domain, the method comprising:

receiving from a first individual said input relating to said finite domain;

automatically translating said input into an output statement in a target language, where said translating comprises using a processor to select at least one appropriate word form for at least one word in said input based on at least one attribute of a second individual to whom said output statement is directed such that said output statement is substantially sociolinguistically appropriate;

outputting said output statement at least once;

confirming that said second individual understands said output statement; and re-attempting translation of said input if said second individual does not understand said output statement, wherein said re-attempting comprises modifying a prosody of said output statement, wherein said prosody is modified in a portion of said output statement that is not understood by said second individual.

16. The computer readable storage medium of claim 15, further comprising:

interrupting said translating to correct at least one error in said input.

17. The computer readable storage medium of claim 15, wherein said input is at least one of: a graphical user interface input, a gesture input, a text input in a source language, an image input, a spoken input in a source language, a pre-programmed phrase in a source language, or data retrieved from a database.

18. The computer readable storage medium of claim 17, wherein said data retrieved from a database relates to said second individual.

19. The computer readable storage medium of claim 18, wherein said data identifies at least one of: said target language, a preferred output method, a gender of said second individual, an age of said second individual, other information that plays a role in generating grammatically correct and sociolinguistically appropriate translations, a medical history of said second individual, or one or more drugs or devices used by said individual second.

20. The computer readable storage medium of claim 15, wherein said input is received via at least one of: a keyboard, a stylus, a touch screen, a mouse, a pen, a barcode scanner, a camera, a microphone, or a network connected to a database.

21. The computer readable storage medium of claim 15, wherein said input is received in a template form.

22. The computer readable storage medium of claim 15, wherein said input comprises said at least one attribute that is needed in order to produce a sociolinguistically appropriate translation of said input into said target language.

23. The computer readable storage medium of claim 15, wherein said translating is performed in accordance with knowledge of a structure of said target language.

24. The computer readable storage medium of claim 15, wherein said output statement is output in at least one of: a text form, an audio form, a video form, a graphical form, a haptic form, or a Braille form.

25. The computer readable storage medium of claim 15, wherein said output statement is output by concatenating pre-recorded fragments of speech.

26. The computer readable storage medium of claim 15, wherein said output statement is output in accordance with a speech generation technique.

27. The computer readable storage medium of claim 15, wherein understanding of said second individual is confirmed by presenting said second individual with one or more questions to test said understanding.

28. The computer readable storage medium of claim 15, wherein the translating comprises determining whether to use a formal or informal form of the target language.

* * * * *